United States Patent [19]
Zellweger

[11] Patent Number: 5,639,354
[45] Date of Patent: Jun. 17, 1997

[54] DISTILLATION DEVICE

[75] Inventor: Adolf Zellweger, Gossau, Switzerland

[73] Assignee: Resona Innovation AG, Gossau, Switzerland

[21] Appl. No.: 719,591

[22] Filed: Sep. 25, 1996

Related U.S. Application Data

[63] Continuation of Ser. No. 341,659, Nov. 17, 1994, abandoned.

[51] Int. Cl.$^6$ ............................................. B01D 3/08
[52] U.S. Cl. ............................ 202/238; 159/6.1; 159/7; 159/DIG. 41; 202/266; 203/100; 203/DIG. 2; 422/101; 422/104
[58] Field of Search ......................... 202/238, 266, 202/267.1, 189; 203/DIG. 2, 100, 86; 159/6.1, 7, 11.1–11.3, 12, 23, 44, DIG. 41; 422/101, 104, 99; 494/14

[56] References Cited

U.S. PATENT DOCUMENTS

| | | | |
|---|---|---|---|
| 3,342,696 | 9/1967 | Bush | 202/238 |
| 3,461,040 | 8/1969 | Borbonese et al. | 196/112 |
| 4,453,639 | 6/1984 | Sharma | 422/104 |
| 4,465,554 | 8/1984 | Glass | 159/16.1 |
| 4,522,684 | 6/1985 | Saito | 159/25.1 |
| 4,728,501 | 3/1988 | Atake | 422/100 |
| 4,738,295 | 4/1988 | Genser | 202/238 |
| 4,759,825 | 7/1988 | Medvey et al. | 202/238 |
| 4,764,250 | 8/1988 | Riehl et al. | 202/238 |
| 4,780,178 | 10/1988 | Yoshida et al. | 202/238 |
| 5,337,806 | 8/1994 | Trunner | 165/47 |
| 5,338,409 | 8/1994 | Heierli | 202/238 |
| 5,370,843 | 12/1994 | Chiodo | 422/99 |

FOREIGN PATENT DOCUMENTS 014090972  11/1984  European Pat. Off. .

*Primary Examiner*—Virginia Manoharan
*Attorney, Agent, or Firm*—Collard & Roe, P.C.

[57] ABSTRACT

A distillation device with a rotating evaporator flask disposed within a heated bath. The heated bath is movable down and away from the evaporator flask to provide space for an evaporator flask support below the evaporator flask. The evaporator flask support holds the evaporator flask while it is connected or disconnected from the rotary drive. In addition, a U-shaped case accommodates the collecting flask and/or evaporator flask. The case supports the flask in an upright manner and facilitates positioning and transporting of the flask.

21 Claims, 4 Drawing Sheets

DISTILLATION DEVICE

This is a continuation of copending application(s) Ser. No. 08/341,659 filed on Nov. 17, 1994, now abandoned.

BACKGROUND OF THE INVENTION

1. Field of the Invention

The present invention relates to a distillation device, and in particular a rotary evaporator. The evaporator flask of the distillation device is movable into and out of a heated bath.

2. The Prior Art

It is known that spherical and pear-shaped evaporator and collecting flasks made of glass are used in rotary evaporators. Handling of the flasks is unsafe and difficult due to their spherical- or pear-shaped form. Additional problems develop when large-volume evaporator and collecting flasks are handled. For example, when a large-volume evaporator flask is exchanged above the heated bath, the possibility of dropping the flask poses a potential hazard to the user. Furthermore, the evaporator and collecting flasks have the common drawback that they cannot be placed upright on a surface because they lack flat bottom surfaces. Upright placement, separately from the rotary evaporator, is therefore impossible. This is troublesome, for example during replacement and cleaning operations, or during predetermined placements or replacements.

The problem of the invention is to create measures for the simple and safe handling of evaporator and collecting flasks in rotary evaporators, as well as for the safe placement of such flasks.

SUMMARY OF THE INVENTION

It is therefore an object of the present invention to overcome the drawbacks of the prior art and to provide a device for safely supporting an evaporator flask during handling.

It is a further object of the present invention to provide a device for supporting the evaporator flask safely above the heated bath.

These and other related objects are achieved according to the invention by a device for distilling a mixture to extract a distillate, having an evaporator flask containing the mixture and a drive coupled to the evaporator flask for rotating the evaporator flask. A condenser and a collecting flask are operatively coupled to the evaporator flask for condensing and collecting the distillate. A heated bath is provided for selectively heating the evaporator flask and the mixture. The heated bath and evaporator flask are movable relative to each other between the first position where the evaporator flask is disposed within the heated bath, and a second position, where the evaporator flask is spaced from the heated bath. The heated bath is moved or swiveled into the second position, so that an evaporator flask support can be introduced between the heated bath and the evaporator flask to support the evaporator flask above the heated bath. The evaporator flask support safely holds the evaporator flask spaced above the heated bath, so that it can be safely and easily handled.

The evaporator flask support includes two rigidly mounted guide rails and two support rods disposed parallel to each other and slidably mounted on the guide rails for tangentially contacting the evaporator flask. Since the support rods are slidably mounted, they can support flasks of different dimensions. The support rods are selectively locked to the guide rails and can be moved to a release position. In the release position, the support rods clear the heated bath to avoid obstructing it during movement of the heated bath. Optionally, a motorized lifting system moves the heated bath between the first and second positions. A power switch provides power to the motorized lifting system. The evaporator flask support closes the power switch when moved to the release position to provide power to the motorized lifting system.

Alternatively, the evaporator flask support is a geometrically shaped platform which can be displaced and/or swiveled into and out of position above the heated bath. The platform comprises an annular ring that is rigidly attached to the device. A flexible material extends across the annular ring to form a support surface for the evaporator flask. The flexible material is netting, fabric or a similar material. Alternatively, the evaporator flask support consists of a plate that can be freely pushed and/or swiveled into and out of position. Handling of the evaporator flask is further simplified if the evaporator flask support is telescopingly extensibly forward and beyond the front side of the housing. In this way, the evaporator flask, once disconnected from the motor drive, can be removed for further handling, away from the heated bath.

The evaporator flask support may be directly or indirectly coupled to the heated bath. The evaporator flask is preferably connected to the motor drive by a hollow cylindrical neck, integrally formed with a widened convex flange. The drive includes an associated widened concave coupling surface for mating with the widened convex flange. The evaporator flask support is movable to a release position adjacent the drive wherein the evaporated flask may be readily connected and disconnected from the drive.

In an alternate embodiment, the device for distilling a mixture to extract a distillate includes a rotatable evaporator flask containing the mixture and a heated bath for selectively heating the evaporator flask and the mixture. A condenser is operatively coupled to the evaporator flask for condensing the distillate, and a collecting flask is operatively coupled to the condenser for collecting the distillate. A case encloses the collecting flask for positioning and transporting the collecting flask. The case is a substantially U-shaped clamp having a planar base member for supporting the collecting flask and two leg members extending upwardly from the planar base member.

Each leg member includes a free upper end and two leg sections bordering a slot-shaped aperture that extends to the free upper end. The slot-shaped aperture further serves as a viewing window for observing the collecting flask. Each leg section is bent inwardly toward the collecting flask at the free upper end to grip the collecting flask. The case further includes an outwardly bent handle disposed at a lower border of each slot-shaped aperture. The aperture accommodates sections of the collecting flask with the leg sections defining support members, which contact the collecting flask. The leg sections are biased toward the collecting flask to secure it in the upright position.

Alternatively, the case is a substantially U-shaped jacket having a planar base member, for supporting the collecting flask, and two leg members. Each leg member includes a free upper end and two leg sections bordering the slot-shaped aperture. An adjustable support bracket is disposed within the case for raising and lowering the collecting flask within the case. A cover is detachably connected to the free upper end and includes an opening for accommodating the neck of the collecting flask. The support bracket includes a circular opening for accommodating a bottom section of the collecting flask. The device further includes a housing and a support member, rigidly connected to the housing for engaging the case. The support member is positioned so that the collecting flask is connectable to the condensor when the case engages the support member. The support member is a U-shaped bow having two support arms and a bridge part extending between the two support arms and rigidly connected to the housing.

Support rollers are provided for rolling the case along the two support arms. Each of the two support arms includes a free end, wherein the case engages the two support arms via the free ends. The length between the bridge part and the free ends is adjustable. The support arms include inner surfaces facing each other and top surfaces. The support rollers are rotatably mounted on the inner surfaces and extend above the top surfaces. A resilient elastic stop is attached to the bridge part for reducing impact forces on the collecting flask. The case is made from metal or molded plastic. The case has spring members disposed on the two leg members facing each other for cushioning the collecting flask within the case. The cover includes outwardly bent sections defining handles. The invention also contemplates a separate case for the evaporator flask so that it can be freely and safely handled.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
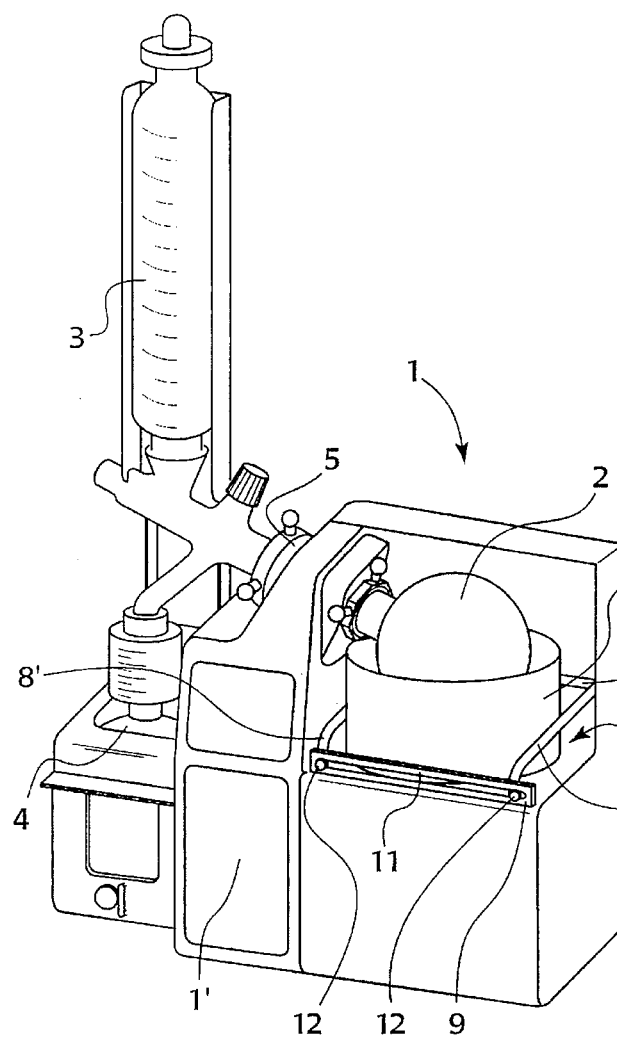
FIG. 1 is a perspective view of a rotary evaporator.

In the drawing figures, there is shown a housing 1' of a rotary evaporator 1, which has a ball-shaped or spherical evaporator flask 2, a condenser 3, and a ball-shaped or spherical collecting flask 4. The evaporator flask 2 is connected to a motor drive 5 during use. A heated bath 6, for example, a water or oil bath is provided for evaporator flask 2.

Figure 2:
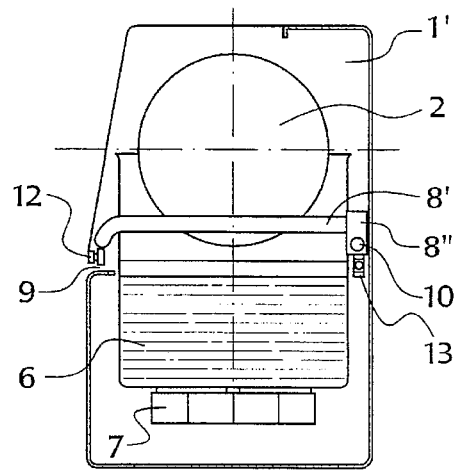
FIG. 2 is a cross-sectional view of an evaporator flask with a support and heated bath.
Figure 3:
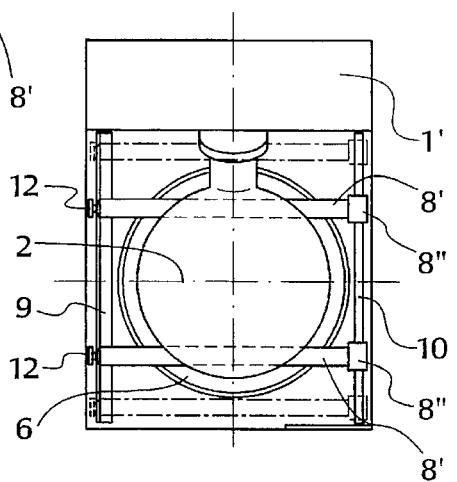
FIG. 3 is a top view of an evaporator flask with the support and the heated bath.
Figure 4:
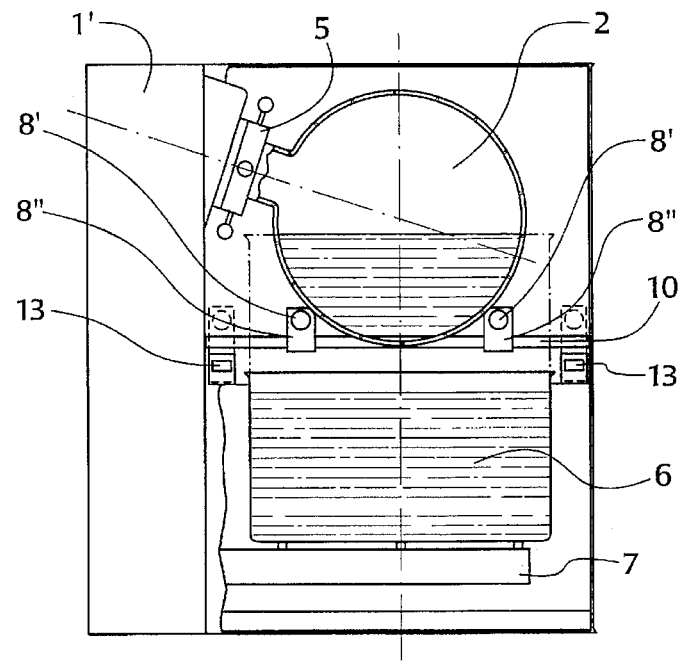
FIG. 4 is another cross-sectional view of an evaporator flask with the support and the heated bath.

FIGS. 2 and 4 show bath 6 set on a platform 7, which is vertically or manually adjustable by a motor. For distilling operations, evaporator flask 2 is placed within heated bath 6. For easy and safe handling of evaporator flask 2, the heated bath 6 is lowered by means of platform 7 from the operating position shown in FIG. 1 into the resting position shown in FIGS. 2 and 4. A support 8 for supporting evaporator flask 2 can be moved into the zone between evaporator flask 2 and heated bath 6.

In FIGS. 1 to 4, support 8 is formed by two parallel rods 8', each of which include a threaded end 12. Guide rails 9 and 10 are rigidly joined with housing 1'. Rail 9 has slots 11, through which threaded ends 12 extend. Cooperatively threaded nuts engage threaded ends 12 to clamp rods 8' to rail 9. Guide rail 10 is formed by a rail or a rod, which is displaceably engaged by sleeves 8" (FIG. 3), which are arranged on rods 8' opposite threaded ends 12. Rods 8' are tangentially placed against the evaporator flask 2 (FIGS. 3 and 4) and fixed there by means of threaded ends 12 and the threaded nuts. In this position, evaporator flask 2 is spaced above the lowered heated bath 6 by support 8. Evaporator flask 2 can now be easily separated from motor drive 5, for example, by swiveling, which is facilitated by the ball segment-shaped separation surfaces 42, 43 on the evaporator flask and on the drive. Rods 8' can be locked in position along guide rails 9, 10 across their entire range of displacement.

For lifting heated bath 6, limit switches 13 (FIGS. 2 and 4) are arranged in the power circuit of the driving motor lifting system (not shown). Rods 8' close limit switches 13 at their outer end positions, which assures a motor-driven lifting of the heated bath 6 into the operating position of FIG. 1 without obstruction from rods 8'. If rods 8' are not in the outer end positions, the power circuit of the driving motor for the lifting operation remains open, which prevents lifting of heated bath 6.

Figure 12:
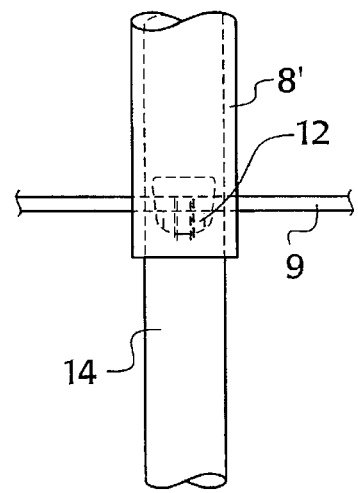
FIG. 12 is an enlarged view of a variable length support section.
Figure 11:
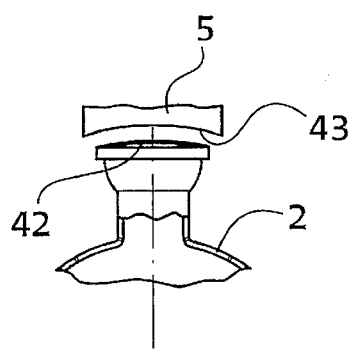
FIG. 11 is a fragmentary side-elevational view of a part piece of a collecting flask.
Figure 13:
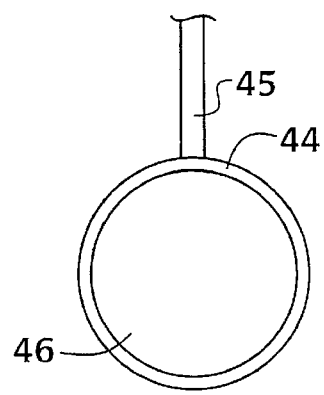
FIG. 13 is a top view of an alternate embodiment of the support.

FIGS. 1 to 4 show rods 8' disposed within the dimensions of the front side of housing 1' of the rotary evaporator. Rods 8' shown in FIG. 12 are telescopically extendible toward and beyond the front of housing 1'. In this way, evaporator flask 2, upon being separated from the motorized rotary drive 5, is removable to the front along extensions 14 away from heated bath 6. For attaching evaporator flask 2 to motor drive 5, evaporator flask 2 can be pushed along extension 14 onto rods 8'. FIG. 13 shows a support formed by a ring body 44, which is, for example, swivel-mounted on the evaporator housing 1' by a bar 45.

Figure 5:
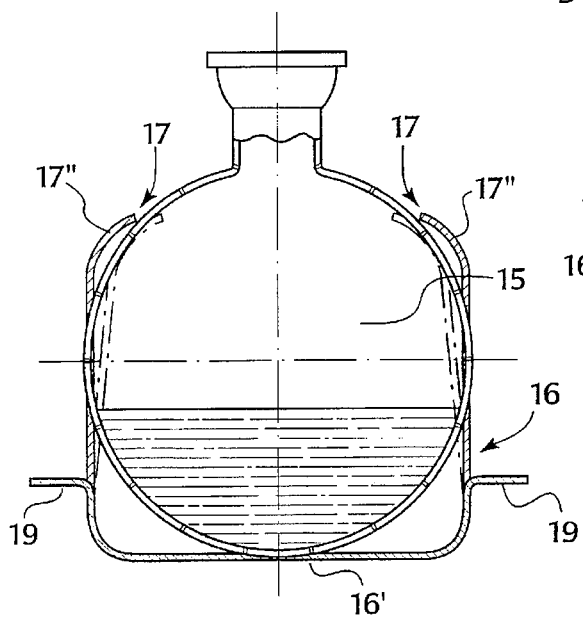
FIG. 5 is a cross-sectional view of a collecting flask with a case.
Figure 6:
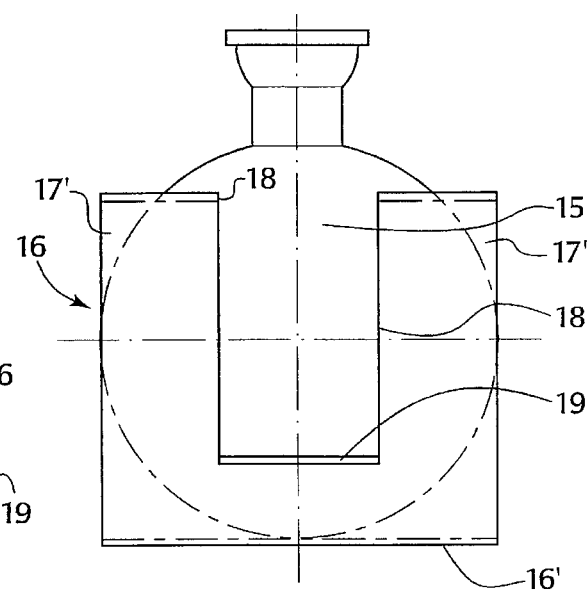
FIG. 6 is a front elevational view of a collecting flask with a case according to FIG. 5.

In FIGS. 5 and 6, a glass collecting flask 15 for a rotary evaporator 1 is shown, which is spherical or ball-shaped and embraced by a simplified case. The case is a substantially U-shaped clamp 16, having a bridge part 16', which forms a planar base member and legs 17, which support the collecting flask 15 to prevent it from tilting. Legs 17 have at the top ends a slot-shaped aperture 18. The collecting flask 18 is inserted in the clamp 16 from the top open end, whereby collecting flask 18 is accommodated within apertures 18. Leg sections 17' which border apertures 18 are preferably resiliently biased to rest with pretension against the collecting flask 15 (FIG. 5). In addition, at free ends 17", the leg sections 17' are bent inwardly toward each other, which prevents the collecting flask 15 from unintentionally sliding upwardly out of clamp 16. Clamp 16 is preferably formed from a metallic or plastic material. Apertures 18 are limited at their lower ends by strip-shaped outward bends 19, which serve as handles for superior mobility of the case and the collecting flask 15.

Figure 7:
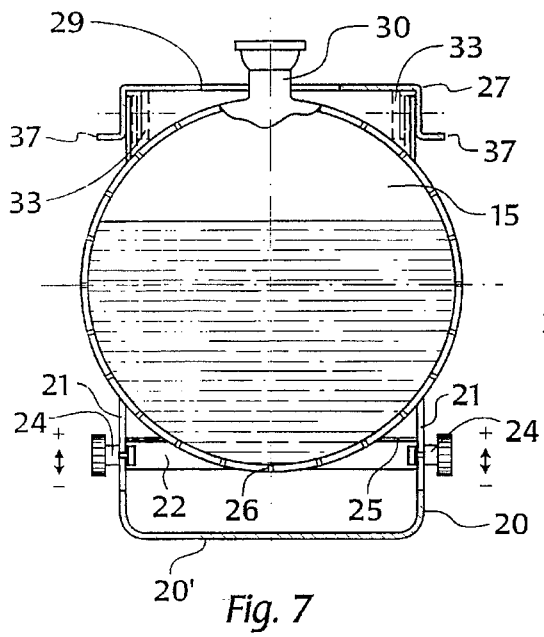
FIG. 7 is a cross-sectional view of a collecting flask with a case according to an alternate embodiment.
Figure 8:
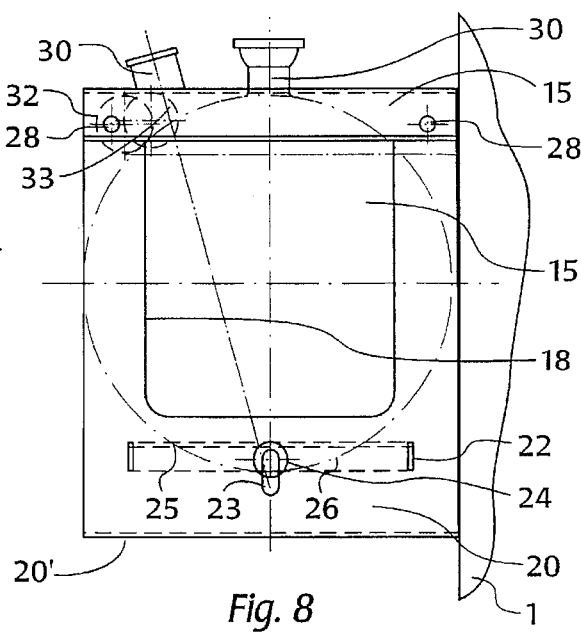
FIG. 8 is a front elevational view of a case according to FIG. 7, with the collecting flask and the support device.
Figure 9:
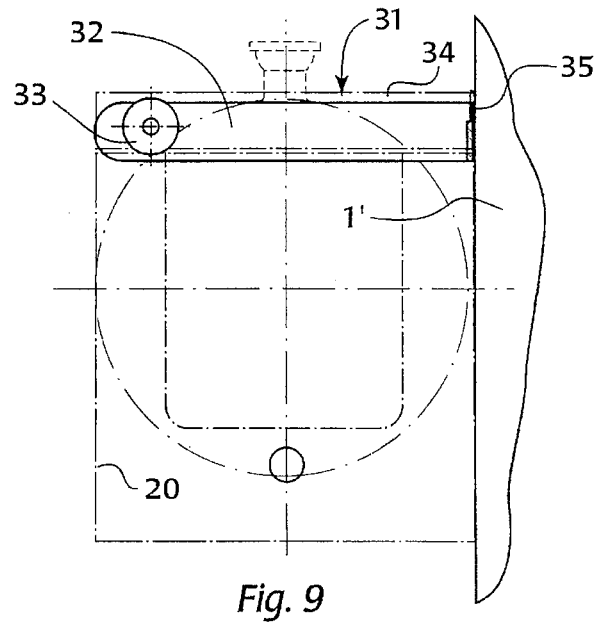
FIG. 9 is a cross-sectional view of a support device for a case.
Figure 10:
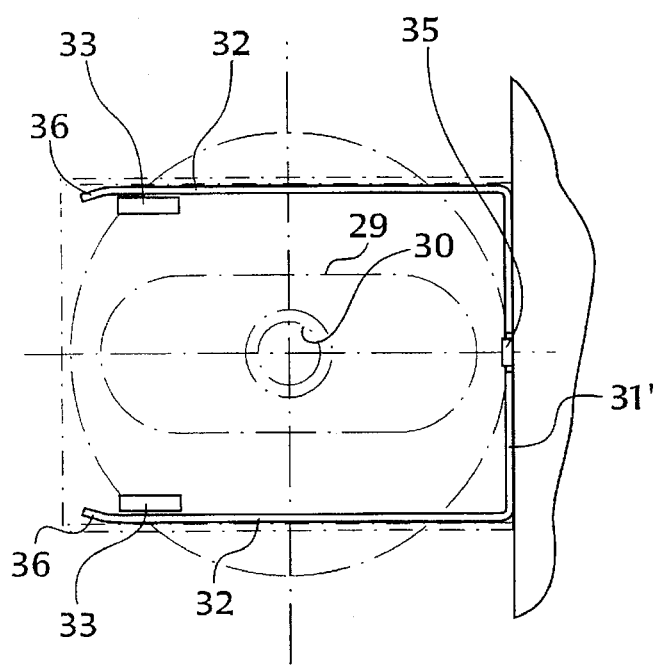
FIG. 10 is a top view of a support device for a case according to FIG. 9.

In FIG. 7, for example, a large-volume collecting flask 15 having a ball or spherical shape is inserted in a U-shaped jacket 20 serving as a case, and set up on an adjustable support bracket 22 arranged on the legs 21 as the bottom support. Support bracket 22 is positionable at various levels on legs 21 by set screws 24 residing within slots 23 (FIG. 8) of the legs. Collecting flask 15 is supported upright within jacket 20 by the arrangement of a circular opening 25 in the platform 22, as well as by apertures 18 which accommodate sections 26 of the collecting flask 15. At the top end, the jacket 20 is sealed by a cover part 27, which is fixed on the jacket 20 by screws 28 (FIG. 8). An opening 29 in the cover part 27 allows a throat 30 of the collecting flask 15 to exit therefrom for connection to the condenser. The flat bridge part 20' of the jacket 20 again serves as a set-up surface, permitting the case and the collecting flask 15 to be handled in any desired way independently of each other, and also to be safely set down.

The case according to FIGS. 7 to 10 is suspended on the evaporator housing 1' by a U-shaped bow 31. The bow 31, has a bridge part 31', which is rigidly connected with the evaporator housing 1' with legs 32 supporting the case. The inside of legs 32 have support rollers 33, of which the rolling plane—as shown in FIG. 8—extends slightly higher than the top edges 34 of the legs 32. After the case has been suspended on legs 32, it is possible by means of the rollers 33 to easily bring the case and the collecting flask 15 into the operating position. For cushioning and for protecting the case and the collecting flask 15, the holder has a resilient elastic stop 35 consisting of a springy elastic or flexible material, for example rubber. The suspension of the case on legs 32 is facilitated by the inward bends 36 on the legs. Usefully, the lower edges 37 of the cover part 27 are bent outwardly for forming handles.

While several embodiments of the present invention have been shown and described, it is to be understood that many changes and modifications may be made thereunto without departing from the spirit and scope of the invention as defined in the appended claims.

What is claimed is:

1. A device for distilling a mixture to obtain a distillate, comprising:

an evaporator flask containing the mixture;

a drive coupled to said evaporator flask for rotating said evaporator flask;

a condensor and a collecting flask operatively coupled to said evaporator flask for condensing and collecting the distillate;

a heated bath for selectively heating said evaporator flask and the mixture; said heating bath and said evaporator flask being movable relative to each other between a first position wherein said evaporator flask is disposed within said heated bath and a second position wherein said evaporator flask is spaced from said heated bath; and an evaporator flask support comprising:
two rigidly mounted guide rails; and
two support rods disposed parallel to each other and slidably mounted on said guide rails for tangentially contacting said evaporator flask, said support rods being releasably locked to said guide rails;

wherein when said evaporator flask is spaced from said heated bath in said second position, said evaporator flask support is removably and securely inserted between said evaporator flask and said heated bath to support said evaporator flask above said heated bath.

2. The device according to claim 1, comprising:

a motorized lifting system for moving said heated bath between said first and second positions; and a switch for providing power to said motorized lifting system;

wherein said evaporator flask support is movable to a release position beyond said heated bath, wherein in said release position said evaporator flask support closes said switch to provide power to said motorized lifting system.

3. The device according to claim 1, comprising:

a case enclosing said collecting flask for positioning and transporting said collecting flask.

4. The device according to claim 3, wherein said case is a substantially U-shaped clamp comprising:

a planar base member for supporting said collecting flask; and two leg members, each leg member including a free upper end and two leg sections bordering a slot-shaped aperture that extends to said free upper end for accommodating sections of said collecting flask, said leg sections define support members which contact said collecting flask.

5. The device according to claim 4, wherein said leg sections are biased toward said collecting flask.

6. The device according to claim 4, wherein each leg section is bent inwardly toward said collecting flask at said free upper end to grip said collecting flask.

7. The device according to claim 4, wherein said case comprises:

an outwardly bent handle disposed at a lower border of each slot-shaped aperture.

8. The device according to claim 4, wherein said case comprises spring members disposed on said two leg members facing each other and cushioning said collecting flask within said case.

9. The device according to claim 3, wherein said case is a substantially U-shaped jacket comprising:

a planar base member for supporting said collecting flask;

two leg members, each leg member including a free upper end and two leg sections bordering a slot-shaped aperture that extends to said free upper end for accommodating sections of said collecting flask, said leg sections define support members which contact said collecting flask;

an adjustable support bracket for raising and lowering said collecting flask within said U-shaped jacket;

a cover including an opening for accommodating a neck of said collecting flask, said cover is detachably connected to said free upper ends.

10. The device according to claim 9, wherein said slot-shaped apertures are see-through windows.

11. The device according to claim 9, wherein said support bracket includes a circular opening for accommodating a bottom section of said collecting flask.

12. The device according to claim 9, wherein said case is made from metal.

13. The device according to claim 9, wherein said case is made from molded plastic.

14. The device according to claim 9, wherein said cover includes outwardly bent sections defining handles.

15. The device according to claim 9, comprising:

a housing and a support member rigidly connected to said housing, for engaging said case;

said support member is positioned so that said collecting flask is connectable to said condenser when said case engages said support member.

16. The device according to claim 15, wherein said support member is a U-shaped bow comprising:

two support arms; and a bridge part extending between said two support arms and rigidly connected to said housing.

17. The device according to claim 16, comprising support rollers for rolling said case along said two support arms.

18. The device according to claim 17, wherein said support arms include inner surfaces facing each other and top surfaces;

wherein said support rollers are rotatably mounted on said inner surfaces and extend above said top surfaces.

19. The device according to claim 16, wherein each of said two support arms includes a free end;

wherein said case engages said two support arms via said free ends.

20. The device according to claim 19, wherein the length between said bridge part and said free ends is adjustable.

21. The device according to claim 16, comprising:

a resilient elastic stop attached to said bridge part for reducing impact forces on said collecting flask.

* * * * *